UNITED STATES PATENT OFFICE.

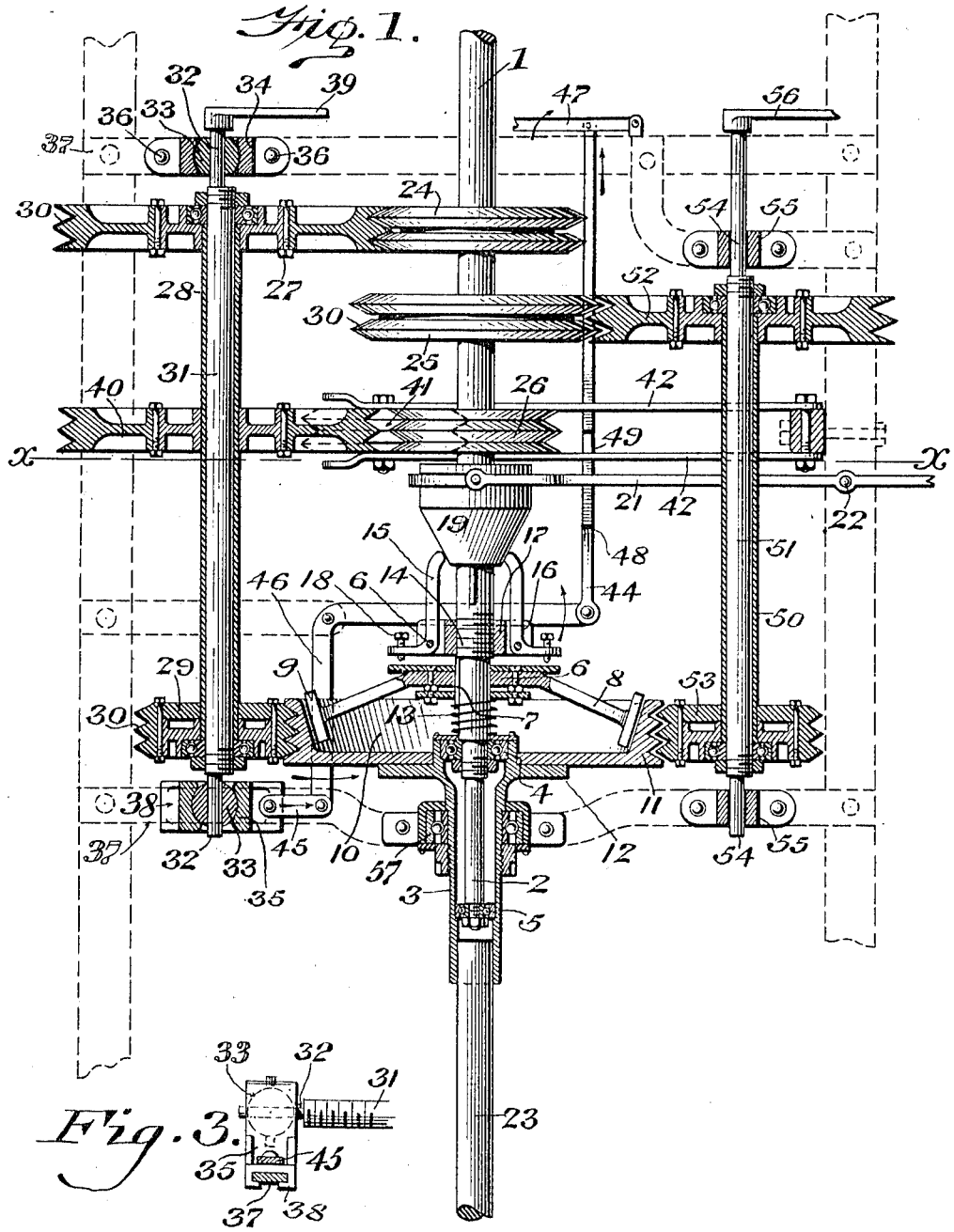

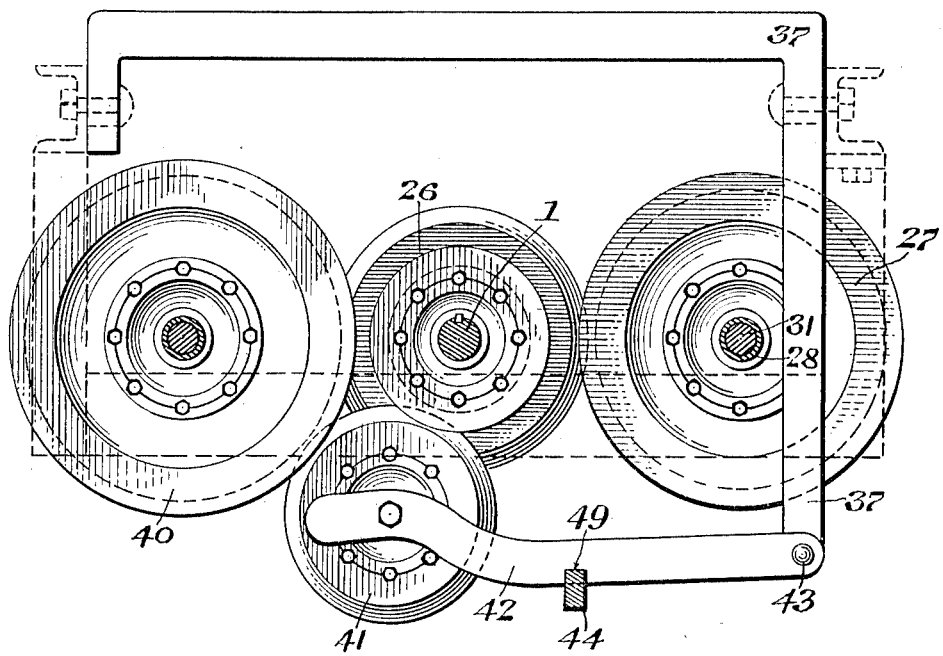
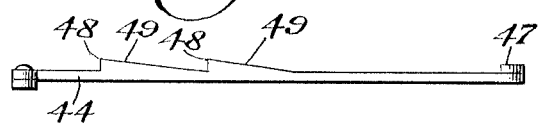

WILLIAM S. KINDLE AND ABRAM L. PLUSH, OF PHILADELPHIA, PENNSYLVANIA, ASSIGNORS, BY MESNE ASSIGNMENTS, TO SAID PLUSH.

VARIABLE-SPEED GEARING.

1,072,407.  Specification of Letters Patent.  Patented Sept. 2, 1913.

Application filed August 15, 1911. Serial No. 644,193.

*To all whom it may concern:*

Be it known that we, WILLIAM S. KINDLE and ABRAM L. PLUSH, both citizens of the United States, residing in the city and county of Philadelphia, State of Pennsylvania, have invented a new and useful Variable-Speed Gearing, of which the following is a specification.

This invention relates to a friction transmission mechanism for use in connection with automobiles, motor boats and kindred uses, wherein it is desired to transmit variable speed from a driving shaft to a driven shaft and wherein it is also desired to effect a reverse driving of one shaft with respect to the other.

It has for an object to provide a mechanism wherein a plurality of sets of friction wheels are employed for effecting a variable speed, each set being independently operable and controlling a certain definite speed of rotation of the driven shaft, and wherein a reversing mechanism is utilized comprising likewise a friction means for effecting the desired end.

It has for a further object to provide a direct drive wherein the driving shaft is adapted to be so connected to the driven shaft as to transmit power from one to the other without any brake drag, or waste of power due to friction of auxiliary parts, and by which means the motor is not retarded or any of the energy thereof wasted. Furthermore the clutch mechanism can be instaneously connected or disconnected, while the driving shaft and the driven shaft are revolving at any ratio of speed without noise, jar, shock or surge.

It further consists of other novel features of construction, all as will be hereinafter fully set forth.

Figure 1 represents a plan partly in section of a transmission gearing embodying our invention. Fig. 2 represents a section on line $x$—$x$, Fig. 1. Fig. 3 represents a detail of the movable bearing structure. Fig. 4 represents a detail of construction.

Similar numerals of reference indicate corresponding parts in the figures.

Referring to the drawings: 1 designates the engine or driving shaft which is suitably mounted for rotation and, in the present instance, is provided with a reduced portion 2, adapted to fit within a sleeve 3 and rotate independently thereof, through the medium of the bearings 4 and 5.

6 designates a clutch member slidingly mounted on the shaft 1 and secured thereto by means of a key 7 or the like, in order that it may rotate with said shaft, and having outwardly extending arms 8 terminating in friction shoes 9 adapted to engage with the clutch face 10 of the friction wheel 11, the latter being preferably secured in a fixed manner to a flange 12, of the sleeve 3. Normally the friction member 6 is held out of engagement with the clutch face 10, through the medium of a spring or the like 13, and seats against a shoulder 14 on the shaft 1. Movement of the clutch member 6 is effected, in the present instance, by means of levers 15 pivoted at 16 to a collar 17, preferably screw-threaded to the shaft 1, whereby its position is fixed relative to the moving parts.

As here shown, the levers 15 are provided with studs 18 or the like, extending therethrough and adapted to engage the face of the clutch member 6 and shift the said member into engagement with the clutch face 10 whereby a direct drive from the engine shaft is effected. In order to actuate the levers 15 a shift cone 19 is provided which is suitably mounted on the shaft 1 for sliding movement relative thereto so that the cone surface thereof will engage the levers 15 and force the same outwardly, as will be apparent. This shift cone is preferably operated by a lever 21, pivoted at 22 and attached to the cone by a suitable connection permitting movement between the two parts.

23 designates the driven shaft which, in the present instance, is fixedly secured to the sleeve 3 and receives motion therefrom as transmitted by the friction wheel 11. In order to provide for slow and intermediate speeds, and also reverse driving of the shaft 23, we preferably provide friction wheels 24, 25 and 26, all of which are fixedly secured to the shaft 1 and suitably positioned with respect to their coöperating adjuncts. The friction wheel 24 is located in alinement with a second friction wheel 27, fixedly mounted on a sleeve 28 which forms a countershaft adjacent the engine shaft 1, and by means of which motion is transmitted to a friction wheel 29 located in alinement with the clutch friction wheel 11, it being noted, in the present instance, that all of the friction wheels, as here shown, are provided with grooved surfaces 30 in order to increase the friction between the engaging parts.

31 designates a spindle passing through the sleeve 28 and preferably contacting therewith, the said spindle having reduced ends 32 formed eccentric thereto whereby turning movement of the same causes movement of the sleeve 28 toward or away from the shaft 1. The ends 32 each carry a disk 33 or the like mounted in suitable bearings 34 and 35, the former being fixedly secured by bolts 36 or other suitable fastening means to the frame 37 shown in dotted lines. The bearing 35 is slidingly mounted on the frame by means of the inturned ends 38 of the bearing plate 35, and this construction permits one end of the spindle 31 to be moved toward the driving shaft 1 while the opposite end remains fixed and thus the friction wheel 29 may be brought into engagement with the clutch wheel 10 without moving the friction wheel 27 if desired, it being noted that the disk 33 has a pivotal action within the bearing 34.

39 designates a crank arm fixedly secured to the end 32 of the spindle 31 and by means of which the sleeve 28 may be moved to bring both friction wheels 27 and 29 into engagement with their respective friction members thereby driving the shaft 23 at slow speed.

40 designates a friction wheel fixedly secured to the sleeve 28 and located in alinement with the friction wheel 26 and adapted to drive the sleeve 28 in a reverse direction with respect to the shaft 1. This movement is effected by means of an idle friction wheel 41 mounted in the arms 42 which are pivoted at 43 to a suitable portion of the frame 37 and adapted to be actuated by a bar 44, presently to be described.

45 designates a link secured at one end to the slide bearing 35 and at its opposite end to a suitably pivoted bell crank 46 secured at its opposite end to the bar 44, the latter being connected to the operating lever 47. This bar 44 is preferably provided with offset portions 48 each having an inclined face 49 which are adapted to contact with the arms 42 and raise the same so that the idle wheel 41 is brought into contact with the friction wheels 26 and 40.

50 designates a sleeve suitably mounted on a spindle 51 for rotation with respect thereto, and carrying thereon a friction wheel 52 mounted in alinement with the friction 25 of shaft 1. This sleeve also carries a friction wheel 53 in alinement with the clutch friction wheel 11, both of said friction wheels 52 and 53 being adapted to be brought into engagement with their respective members by means of the eccentric constructions of the spindle ends 54, the latter being suitably mounted in fixed bearings 55, as will be apparent.

56 designates a crank arm secured to the spindle 51 by means of which the same may be shifted to bring the intermediate gear into operative position.

The operation of the device is as follows: With the parts located, as shown in Fig. 1, the slow speed transmission is in position and motion is transmitted from the engine shaft 1 by way of the friction wheels 24 and 27, the sleeve 28, friction wheel 29 and clutch wheel 11 to shaft 23. This movement is effected by a partial rotation of the crank 39, which, through the eccentricity of the spindle 31, brings the parts into the position shown. In order to throw in the intermediate gear, the crank 39 is moved in the opposite direction to withdraw the part carried thereby from engagement with the rotating members, and the crank 56 moved to shift the spindle 51 and carry the two wheels 52 and 53 to frictional engagement with their coöperating parts. For direct or high speed, from the engine shaft 1 to shaft 23, the lever 21 is operated to shift the cone 19 and thereby bring the clutch shoes 9 into engagement with the clutch wheel 11. In order to effect reverse driving of the shaft 23 with respect to the engine shaft 1, the lever 47 is moved to actuate the bell crank 46 whereby the bearing 35 slides with respect to its support and shifts one end of the spindle 31 a sufficient distance to bring the friction wheel 29 into frictional contact with the clutch wheel 11 and simultaneously therewith, the inclined face 49 of bar 44 shifts the arms 42 to bring the idle wheel 41 into operative engagement with the two friction wheels 26 and 40.

In connection with the bearings 4 and 5, attention is directed to the manner of seating these bearings in the sleeve 3, since this construction provides an effective means for a direct drive between the shafts 1 and 23. It will of course be understood that the sleeve 3 is mounted in a bearing 57, which is suitably carried by the main supporting frame 37. The construction just described permits rotation of one shaft relative to another at different speeds and forms an efficient means of eliminating friction between the parts, and if it is desired to drive directly from one shaft to another, the clutch mechanism is brought into operation and the two shafts rotate together independent of the slow or intermediate speeds and also of the reversing mechanism.

It will thus be seen that we have devised a transmission mechanism wherein the low speed, intermediate speed or direct drive may be either selectively controlled, progressively controlled, or combined one with another. By "combined" we mean any two or more speed control devices may be connected to the driving and driven shafts at one and the same time which is a feature highly desirable in the type of work for which the transmission is adapted, since it will readily be seen that in climbing a hill, for instance, under heavy load, it may be necessary to shift from direct drive to an intermediate speed, and then after sufficient momentum has been attained, shift back again to the direct drive while still on the same incline, all of this being accomplished while the two shafts are running. This may be done easily and with great facility by means of our construction, since it is perfectly possible to maintain the direct drive in clutched position, while the intermediate speed mechanism is in operative position and in fact doing the work, and it is not necessary at any time to disconnect the power from the driving shaft to the driven shaft.

It will, of course, be understood that the simultaneous actuation of the driven shaft by two of the speed controlled devices is substantially but a momentary action and is only utilized to shift from one speed to the other without releasing the transmission and allowing the engine to run free and thus lose a large number of explosions before the new speed is properly picked up.

It will now be apparent that we have devised a complete unitary structure, well adapted for the purpose intended, simple in construction and embodying an efficient practical and economical friction transmission mechanism whereby the several parts controlling respectively the slow intermediate and high speed and reverse are independently operable for the purpose intended.

It will now be aparent that we have devised a novel and useful construction of a variable speed gearing for automobiles and other devices which embodies the features of advantage enumerated as desirable in the statement of the invention and the above description, and while we have, in the present instance, shown and described a preferred embodiment thereof which has been found in practice to give satisfactory and reliable results, it is to be understood that the same is susceptible of modification in various particulars without departing from the spirit or scope of the invention, or sacrificing any of its advantages.

Having thus described our invention what we claim as new and desire to secure by Letters Patent, is:—

1. In a device of the character stated, a driving shaft, a driven shaft suitably mounted in alinement with said driving shaft, a countershaft rotatably mounted adjacent said shafts, a fixed bearing for one end of said countershaft, a movable bearing for the opposite end of said countershaft, a friction wheel fixedly secured to said driving shaft, a second friction wheel in alinement therewith and secured to said countershaft, an idler movably mounted between said friction wheels and adapted to transmit motion from one to the other, means to shift one end of said countershaft toward and away from said driven shaft and means to transmit motion from said countershaft to said driven shaft.

2. In a device of the character stated, a driving shaft, a driven shaft suitably mounted in alinement with said driving shaft, a countershaft rotatably mounted adjacent said shafts, a fixed bearing for one end of said countershaft, a movable bearing for the other end thereof, a friction wheel fixedly secured to said driving shaft, a second friction wheel in alinement therewith and secured to said countershaft, an idler movably mounted and adapted to transmit motion from one friction wheel to the other, means to simultaneously shift said movable bearing and move said idler into engaging position, and means to transmit motion from said countershaft to said driven shaft.

3. In a device of the character stated, a driving shaft, a driven shaft suitably mounted in alinement with said driving shaft, a clutch mechanism between said shafts and adapted to transmit motion directly from one to the other, a countershaft rotatably mounted adjacent said shafts, a fixed bearing for one end of said countershaft, a movable bearing for the other end thereof, a friction wheel fixedly secured to said driving shaft, a second friction wheel in alinement therewith and secured to said countershaft, an idler movably mounted between said friction wheels and adapted to transmit motion from one friction wheel to the other, means to shift one end of said countershaft toward and away from said driven shaft, and means to transmit motion from said countershaft to said driven shaft.

4. In a device of the character stated, the combination of a driving shaft, a driven shaft, a laterally movable countershaft arranged in parallel relation with said shafts, mechanism carried in part by said countershaft for varying the speed of said driven shaft relative to said driving shaft, and means to connect said driving and driven shafts for direct drive, said parts being so arranged that said speed mechanisms are operable independently or simultaneously.

5. In a device of the character stated, the combination of a driving shaft, a driven shaft, a plurality of countershafts arranged in parallel relation with said shafts, mechanism in part carried by each countershaft for varying the speed of said driven shaft relative to said driving shaft, independent means for controlling each speed changing mechanism, and means to connect said driving and driven shafts for direct drive, the parts being so arranged that either speed changing device may be operated independently and any two speed devices are operable simultaneously.

The above signed by us this 22nd day of July, 1911.

WILLIAM S. KINDLE.
ABRAM L. PLUSH.

Witnesses:
MARY DONALDSON OBDYKE,
JAMES K. ALLEN.